United States Patent [19]

Viot et al.

[11] Patent Number: 5,051,943
[45] Date of Patent: Sep. 24, 1991

[54] ADDER CIRCUIT WITH AN ENCODED CARRY

[75] Inventors: J. Greg Viot; James L. Broseghini; Eytan Hartung; John P. Dunn, all of Austin, Tex.

[73] Assignee: Motorola, Inc., Schaumburg, Ill.

[21] Appl. No.: 622,078

[22] Filed: Dec. 4, 1990

[51] Int. Cl.$^5$ .............................................. G06F 7/50
[52] U.S. Cl. ...................................... 364/786; 364/784
[58] Field of Search ................................ 364/784, 786

[56] References Cited

U.S. PATENT DOCUMENTS 4,897,808  1/1990  Nakagawa et al. ................ 364/784

Primary Examiner—Gary V. Harkcom
Assistant Examiner—Tan V. Mai
Attorney, Agent, or Firm—Robert L. King

[57] ABSTRACT

An adder circuit that has an encoded carry input, where a bit position weight of the carry input is two, allows the adder circuit to selectively concurrently add a data value of two to a first and a second input data operand of the adder circuit. The adder circuit is also able to add the first and second input data operands with a second carry input that is not encoded. A recoded multiplier combines two partial product calculations into one calculation during only a first partial product calculation operation by using the adder circuit. Partial product calculations are reduced in number during a multiply operation of a data processor.

15 Claims, 4 Drawing Sheets

| $A_{in}$ | $B_{in}$ | $C_{in1}$ | $C_{in2}$ | $S_{out}$ | $C_{out1}$ | $C_{out2}$ |
|---|---|---|---|---|---|---|
| 0 | 0 | 0 | 0 | 0 | 0 | 0 |
| 0 | 0 | 0 | 1 | 0 | 0 | 0 |
| 0 | 0 | 1 | 0 | 1 | 1 | 0 |
| 0 | 0 | 1 | 1 | NOT USED | | |
| 0 | 1 | 0 | 0 | 1 | 0 | 0 |
| 0 | 1 | 0 | 1 | 1 | 1 | 0 |
| 0 | 1 | 1 | 0 | 0 | 1 | 0 |
| 0 | 1 | 1 | 1 | NOT USED | | |
| 1 | 0 | 0 | 0 | 1 | 0 | 0 |
| 1 | 0 | 0 | 1 | 1 | 1 | 0 |
| 1 | 0 | 1 | 0 | 0 | 1 | 0 |
| 1 | 0 | 1 | 1 | NOT USED | | |
| 1 | 1 | 0 | 0 | 0 | 0 | 1 |
| 1 | 1 | 0 | 1 | 0 | 1 | 0 |
| 1 | 1 | 1 | 0 | 1 | 1 | 0 |
| 1 | 1 | 1 | 1 | NOT USED | | |

DATA PROCESSOR
CYCLES

1     PARTIAL PRODUCT 1
       PARTIAL PRODUCT 2

2     PARTIAL PRODUCT 3
       PARTIAL PRODUCT 4

3     PARTIAL PRODUCT 5
       PARTIAL PRODUCT 6

4     PARTIAL PRODUCT 7
       PARTIAL PRODUCT 8

5     INSTRUCTION FETCH

*FIG. 4A*
—PRIOR ART—

DATA PROCESSOR
CYCLES

1     PARTIAL PRODUCT 2
       PARTIAL PRODUCT 3

2     PARTIAL PRODUCT 4
       PARTIAL PRODUCT 5

3     PARTIAL PRODUCT 6
       PARTIAL PRODUCT 7

4     PARTIAL PRODUCT 8
       INSTRUCTION FETCH

*FIG. 4B*

ADDER CIRCUIT WITH AN ENCODED CARRY

CROSS REFERENCE TO RELATED APPLICATION

This application is related to our commonly assigned copending patent application entitled, "A MULTIPLIER HAVING A REDUCED NUMBER OF PARTIAL PRODUCT CALCULATIONS" by Viot et al. Ser. No. 07/622,029, filed simultaneously herewith.

FIELD OF THE INVENTION

This invention relates generally to digital arithmetic circuits, and more particularly, to adder circuits.

BACKGROUND OF THE INVENTION

Adder circuits within a data processor commonly have three inputs: a first addend A-input ($A_{in}$), a second addend B-input ($B_{in}$), and a Carry-input ($C_{in}$), to produce an output having both a Sum-out ($S_{out}$) and a Carry-out ($C_{out}$). A plurality of three-input adder circuits are commonly grouped together to form an arithmetic logic unit (ALU). The ALU is utilized within a data processing unit to execute a variety of data processing instructions, such as a multiply instruction.

Some arithmetic processing applications require a summation of a large number of binary numbers. A known circuit having multiple inputs to accommodate such applications is a multilevel carry-save adder. In one form, four data inputs exist and a four-input adder circuit is used. However, a conventional four-input adder circuit requires two full adder circuits (four half-adder circuits), and a significant increase in die area to be implemented. Therefore, known four-input adder circuits are not commonly implemented in general purpose data processors.

SUMMARY OF THE INVENTION

The previously mentioned needs are fulfilled with the present invention. In one form, an encoded carry input adder circuit and method of operation comprises a first logic means having a first input for receiving a first input signal, and a second input for receiving a second input signal. The first logic means provides an output by performing a predetermined logic function on the first and second inputs. A second logic means is coupled to the output of the first logic means and receives both a third input signal and a fourth input signal. The fourth input signal is weighted in bit position differently from the first, second and third input signals. The adder circuit provides an output sum of the first, second and third input signals when the fourth input signal has a first logic value and provides a summation of the first and second numbers with a predetermined value when the fourth input signal has a second logic value.

BRIEF DESCRIPTION OF THE DRAWINGS

FIG. 1 (B) illustrates in tabular form an adder truth table in accordance with the present invention.

FIG. 4 (A) illustrates in tabular form the number of partial product calculations needed for a multiply instruction.

FIG. 4 (B) illustrates in tabular form the number of partial product calculations for a multiply instruction in accordance with the present invention.

DESCRIPTION OF A PREFERRED EMBODIMENT

FIG. 1 (A) and FIG. 1 (B) respectively illustrate an adder symbol and a truth table of an adder circuit in accordance with the present invention. The adder symbol of FIG. 1 (A) has an A-input ($A_{in}$), a B-input ($B_{in}$), a first Carry-input ($C_{in1}$), a second Carry-input ($C_{in2}$), a first Carry-output ($C_{out1}$), a second Carry-output ($C_{out2}$), and a Sum-out ($S_{out}$). The adder truth table illustrated in FIG. 1 (B) illustrates the data output of the adder symbol of FIG. 1 (A) as a function of its four inputs. Although the adder symbol for the present invention illustrated in FIG. 1 (A) may appear similar to that of an adder symbol of a standard four input adder circuit, the truth table for the adder of the present invention is significantly different than that of a conventional four input adder circuit due to a bit weight encoding of the $C_{in2}$ input.

As shown in FIG. 1 (B), the truth table represents the operation of the adder circuit of the present invention. The function of the adder symbol of FIG. 1 (A) is determined by the logic values at carry-input $C_{in1}$ and carry-input $C_{in2}$; if $C_{in1}=C_{in2}=0$, the function of the adder is ($A_{in}+B_{in}$). If carry-input $C_{in}=1$ and carry-input $C_{in2}=0$, the function of the adder is ($A_{in}+B_{in}+1$). If carry-input $C_{in1}=0$ and carry-input $C_{in2}=1$, the function of the adder is ($A_{in}+B_{in}+2$), and if carry-input $C_{in1}=C_{in2}=1$, the function of the adder in the illustrated form is not utilized. The function ($A_{in}+B_{in}+2$) is a necessary function for an adder circuit used within our recoded multiplier of our copending patent application referenced above and discussed below.

Figures 1A, 1B:
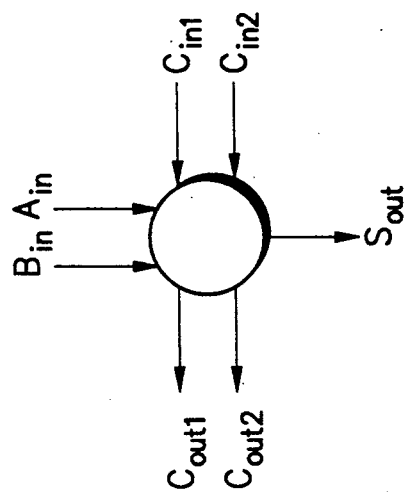
FIG. 1 (A) illustrates in symbolic form an adder symbol in accordance with the present invention.
Figure 2:
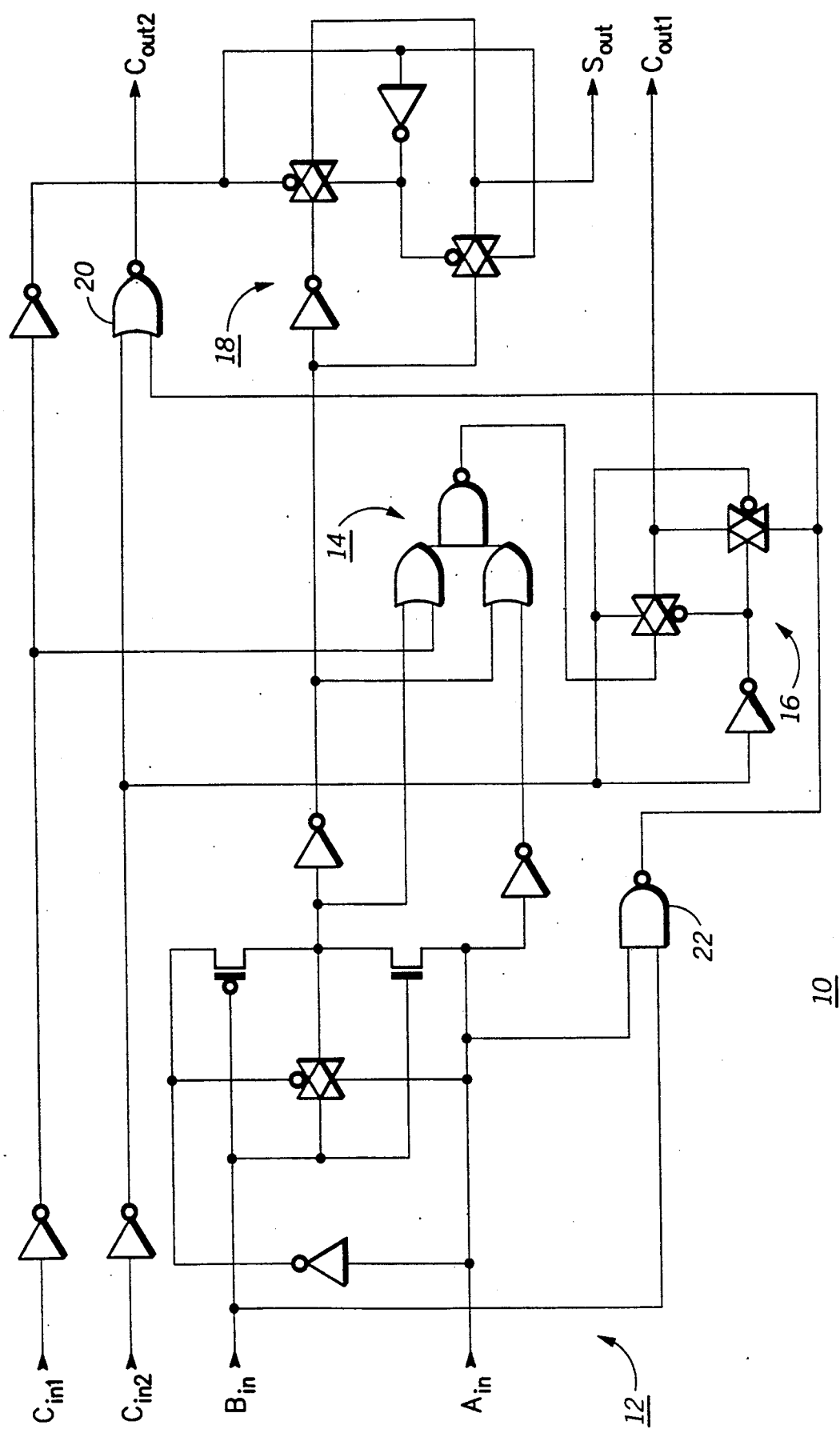
FIG. 2 illustrates in circuit diagram form an implementation of an adder in accordance with the present invention.

Illustrated in FIG. 2 is an adder 10 which is a circuit implementation of the adder symbol and truth table of FIG. 1(A) and FIG. 1(B), in accordance with the present invention. Adder 10 of FIG. 2 has an exclusive-OR (XOR) portion 12, a carry-output $C_{out1}$ logic portion 14, a carry-output $C_{out1}$ multiplexor (mux) portion 16, a sum-output $S_{out}$ portion 18, and logic to generate a carry-output $C_{out2}$ signal. The carry-output $C_{out2}$ logic has a NOR gate 20 and a NAND gate 22. In general, exclusive-OR portion 12 may be considered as a first logic portion, portions 14, 16 and 18 may be considered as a second logic portion, and NAND gate 22 and NOR gate 20 may be considered as a third logic portion. The exclusive OR portion 12 has a first input for receiving a data signal or bit labeled "$A_{in}$", and a second input for receiving a data signal or bit labeled "$B_{in}$". The output of the exclusive OR portion 12 is connected to both an input of the carry-output $C_{out1}$ logic portion 14 and to an input of the sum-output $S_{out}$ portion 18 through an inverter. Another input to the carry-output $C_{out1}$ logic portion 14 is the signal carry-input $C_{in1}$, which is then logically inverted. The output of the carry-output $C_{out1}$ logic portion 14 is connected to a first input of the carry-output $C_{out1}$ mux portion 16. The carry-output $C_{out1}$ mux portion 16 has a second input for receiving an output of the NAND gate 22. The carry-output $C_{out1}$ mux portion 16 is controlled by the logic state of the carry-input $C_{in2}$ signal. The NAND gate 22 has a first and a second input for receiving the data signals $A_{in}$ and $B_{in}$, respectively. The NOR gate 20 has a first input for receiving an output of the NAND gate 22, and a second input from the carry-input $C_{in2}$ signal in logically inverted form. An output of the NOR gate 20 provides carry-output $C_{out2}$.

In operation, the exclusive OR portion 12 provides an exclusive-OR output of the input signals $A_{in}$ and $B_{in}$ for partially determining the value of the sum-output $S_{out}$ and the carry-output $C_{out1}$ signals. If the carry-input $C_{in2}$ signal is a logic zero, the carry-output $C_{out2}$ signal is a logic zero, and the logic values of the carry-output $C_{out1}$ and the sum-output $S_{out}$ signals are determined solely by the inputs $A_{in}$, $B_{in}$, and $C_{in1}$. Also, when the carry-input $C_{in2}$ signal is a logic zero, the sum-output $S_{out}$ and carry-output $C_{out1}$ signal outputs of adder 10 are the same as for a standard two-input adder circuit with a single carry-input. Further, when the carry-input $C_{in2}$ signal is a logic zero, the carry-output $C_{out1}$ mux portion 16 connects the output of the carry-output $C_{out1}$ logic portion 14 to the carry-output $C_{out1}$ output of adder 10. As can be seen from FIG. 2, the sum-output $S_{out}$ signal is independent of the logic state of the carry-input $C_{in2}$ signal. The carry-input $C_{in2}$ signal affects only the logic state of the carry-output $C_{out2}$ and the carry-output $C_{out1}$ signals. When the carry-input $C_{in2}$ signal is a logic one, the carry-output $C_{out1}$ mux portion 16 connects the output of the NAND gate 22 to the carry-output $C_{out1}$ signal output of adder 10. Therefore, when the carry-input $C_{in2}$ signal is a logic one, the carry-output $C_{out1}$ signal output of adder circuit 10 is the logical NAND of the data input signals $A_{in}$ and $B_{in}$. The output of the NAND gate 22 also determines, in part, the carry-output $C_{out2}$ signal output of adder 10. As can be seen in the truth table of FIG. 1(B), and the circuit diagram of FIG. 2, only when the data input signals $A_{in}$, $B_{in}$ and carry-input $C_{in2}$ are each a logic one, will the carry-output $C_{out2}$ signal of adder 10 be a logic one. When the data input signals $A_{in}$ and $B_{in}$ of adder 10 are each a logic one, the output of the NAND gate 22, which is also the first input to the NOR gate 20, is a logic zero. When the carry-input $C_{in2}$ signal is a logic one, the second input to the NOR gate 20 is a logic zero. Therefore, when the carry-input $C_{in2}$ signal is a logic one and the data input signals $A_{in}$ and $B_{in}$ are each a logic one, the output of the NOR gate 20, carry-output $C_{out2}$, is a logic one. In this particular logic implementation of adder 10 of FIG. 2, if carry-input signals $C_{in1}$ and $C_{in2}$ are each a logic one, the logic function of adder 10 is identical to the condition of when carry-input signal $C_{in1}$ is a logic zero and carry-input $C_{in2}$ is a logic one. Essentially, the condition of the carry-input signal $C_{in2}$ being a logic one causes the carry-input signal $C_{in1}$ to become a 'don't-care' input condition.

Figure 3:
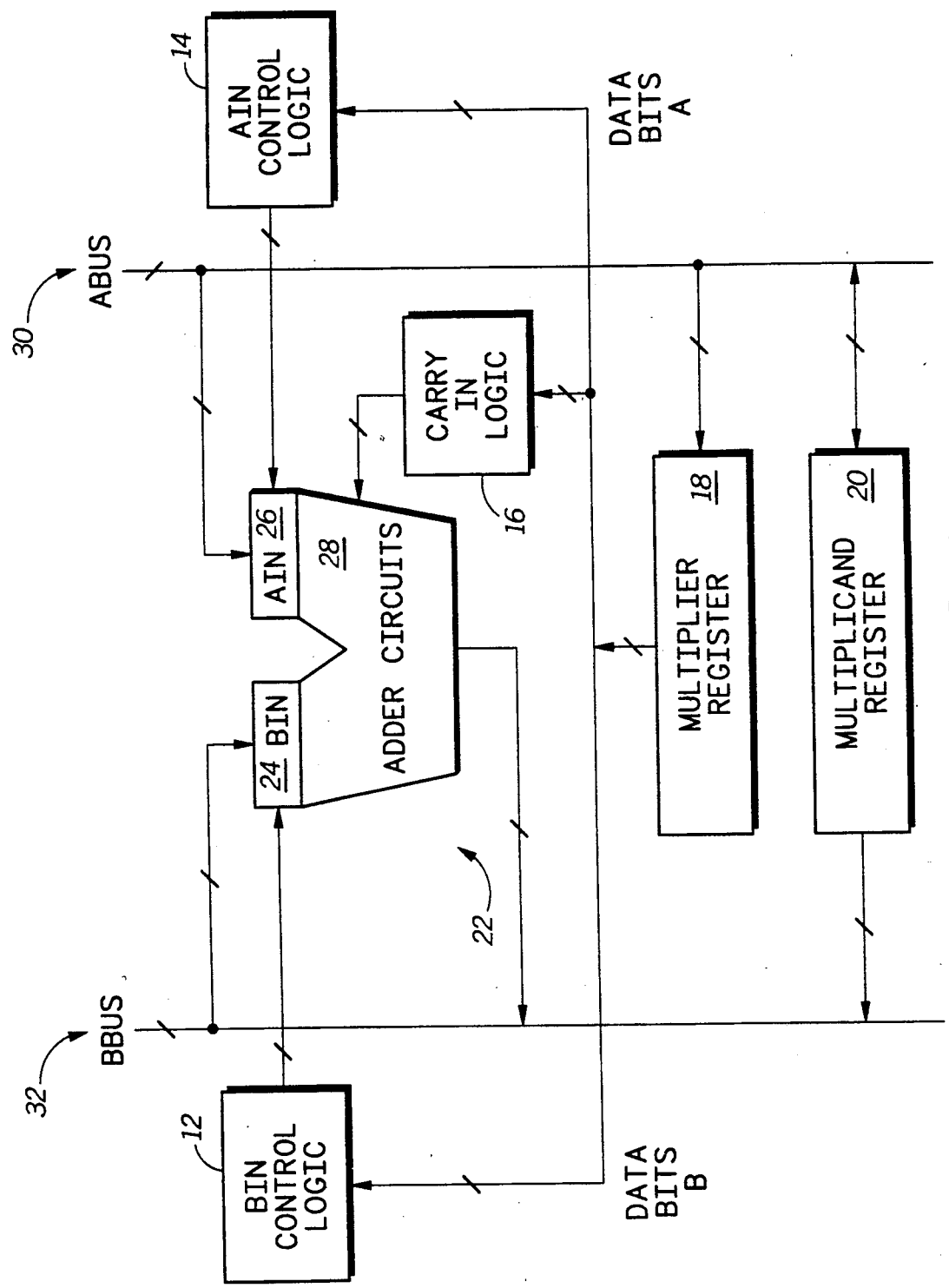
FIG. 3 illustrates in block diagram form a multiplier in accordance with the present invention.

FIG. 3 illustrates a multiplier implemented in hardware within a data processor. The multiplier of FIG. 3 has a $B_{in}$ 12 control logic, an $A_{in}$ 14 control logic, a carry-in logic 16, a multiplier register 18, a multiplicand register 20 and an arithmetic logic unit (ALU) portion 22. Both multiplier register 18, and multiplicand register 20 are data storage registers. The ALU portion 22 has a $B_{in}$ 24 multiplexor, an $A_{in}$ 26 multiplexor, and adder circuits 28. The adder circuits 28 contain a plurality of adder cells, each of which is illustrated in FIG. 1(A), FIG. 1(B) and FIG. 2.

The $B_{in}$ control logic 12 has a data input connected to an output of the multiplier register 18 to receive data, a control output connected to a first input of the $B_{in}$ 24 multiplexor, and is itself controlled by control logic (not shown). The $A_{in}$ 14 control logic has a data input connected to an output of the multiplier register 18 to receive data, a control output connected to a first input of the $A_{in}$ 26 multiplexor, and is itself controlled by control logic (not shown). The carry-in logic 16 has a data input connected to an output of the multiplier register 18 to receive data, a control output connected to an input of each of the adder circuits 28, and is itself controlled by a control logic (not shown). In one form of the invention, adder circuits 28 are implemented by a plurality of adder circuits such as adder 10 in FIG. 2. The sum outputs of each adder is connected in parallel and the carry outputs of each adder is connected in series. When using a plurality of adder 10 circuits as adder circuits 28, the control output of the carry-in logic 16 is a two signal control output. One of the two signals is connected to the carry-input $C_{in1}$ of a least significant adder circuit. A second of the two signals of carry-in logic 16 is connected to the carry-input $C_{in2}$ of the least significant adder circuit.

The multiplier register 18 has a data input connected to a data bus, $A_{bus}$ 30, in order to receive data, and is controlled by a control logic (not shown). The multiplicand register 20 has a data input connected to the $A_{bus}$ 30 in order to receive data, a data output connected to the $A_{bus}$ 30, a data output connected to a data bus, $B_{bus}$ 32, and is controlled by control logic (not shown). The $B_{in}$ 24 multiplexor has a second input connected to the $B_{bus}$ 32 in order to receive data, and an output (not shown) connected to a predetermined one of the $B_{in}$ terminals of an adder cell, illustrated in FIG. 1(A), within the plurality of adder circuits 28. The $A_{in}$ 26 multiplexor has a second input connected to the $A_{bus}$ 30 to receive data, and an output (not shown) connected to a predetermined one of the $A_{in}$ terminals of an adder cell, illustrated in FIG. 1(A), within the plurality of the adder circuits 28. Each of the adder circuits 28 has a data output ($S_{out}$) connected to the $B_{bus}$ 32, and is controlled by control logic (not shown).

In operation, the multiplier register 18 is loaded with a multiplier operand via the $A_{bus}$ 30 from a data register (not shown), and the multiplicand register 20 is loaded with a multiplicand operand via the $A_{bus}$ 30 from a data register (not shown). A predetermined number of least significant data bits, data bits B, from the multiplier register 18 are recoded by the $B_{in}$ 12 control logic. The output of the $B_{in}$ 12 control logic is then used to control the $B_{in}$ 24 multiplexor as described below. Table 1 illustrates the recoding performed by the $B_{in}$ 12 control logic in accordance with Booth's algorithm. It should be apparent that the present invention may be practiced by using other recoding algorithms.

TABLE 1

| DATA BITS B | $B_{in}$ MULTIPLICAND MULTIPLE |
| --- | --- |
| 0 0 | 0 |
| 0 1 | 1 |
| 1 0 | −2 |

When the "$B_{in}$ multiplicand multiple" is a "one", or a "negative one", the $B_{in}$ 12 control logic provides control to the $B_{in}$ 24 multiplexor to shift the input data by zero. When the "$B_{in}$ multiplicand multiple" is a "negative two", the $B_{in}$ 12 control logic provides control to the $B_{in}$ 24 multiplexor to shift the input data left by one bit position. When the "$B_{in}$ multiplicand multiple" is a "zero", the $B_{in}$ 12 control logic provides control to the $B_{in}$ 24 multiplexor to zero the input data operand. During the same time period as the first recoding, a predetermined number of data bits from the multiplier register 18, data bits A, are recoded by the $A_{in}$ 14 control logic. The control output of the $A_{in}$ 14 control logic is used to control the $A_{in}$ 26 multiplexor. Table 2 below illustrates the recoding performed by the $A_{in}$ 14 control logic in accordance with Booth's algorithm.

TABLE 2

| DATA BITS A | $A_{in}$ MULTIPLICAND MULTIPLE |
|---|---|
| 0 0 0 | 0 |
| 0 0 1 | 4 |
| 0 1 0 | 4 |
| 0 1 1 | 8 |
| 1 0 0 | −8 |
| 1 0 1 | −4 |
| 1 1 0 | −4 |
| 1 1 1 | 0 |

When the "$A_{in}$ multiplicand multiple" is a "zero", the $A_{in}$ 14 control logic provides control to the $A_{in}$ 26 multiplexor to zero the input data operand. When the "$A_{in}$ multiplicand multiple" is a "four" or "negative four", the $A_{in}$ 14 control logic provides control to the $A_{in}$ 26 multiplexor to shift the input data left by two bit positions. When the "$A_{in}$ multiplicand multiple" is an "eight" or a "negative eight", the Ain 14 control logic provides control to the $A_{in}$ 26 multiplexor to shift the input data left by three bit positions. During the same time period as the previous recodings, the carry in logic 16 determines the value of the carry-in for the adder circuits 28 based on the sign of both the "$A_{in}$ multiplicand multiple" and the "$B_{in}$ multiplicand multiple". If the signs of both the "$A_{in}$ multiplicand multiple" and "$B_{in}$ multiplicand multiple" are each negative, the carry-in for the adder circuits 28 is a "two". If the sign of either "$A_{in}$ multiplicand multiple" or the "$B_{in}$ multiplicand multiple" is negative, but not both negative, the carry-in for the adder circuits 28 is a "one". If the sign of both the "$A_{in}$ multiplicand multiple" and the "$B_{in}$ multiplicand multiple" are positive, the carry-in for the adder circuits 28 is a "zero". The multiplicand operand data within the multiplicand register 20 is then connected to both the $B_{in}$ 24 multiplexor and the $A_{in}$ 26 multiplexor via the $B_{bus}$ 32 and the $A_{bus}$ 30, respectively. The $A_{in}$ 26 and $B_{in}$ 24 multiplexors shift the multiplicand operand in accordance with the control provided by the $A_{in}$ 14 control logic and the $B_{in}$ 12 control logic, respectively. The adder circuits 28 then sums the shifted data provided by the $A_{in}$ 26 and the $B_{in}$ 24 multiplexors along with the carry-in provided by the carry in logic 16 to produce a first partial product output which is stored in a latch (not shown) within the adder circuits 28. For any remaining partial product calculations, the $B_{in}$ 12 control logic is not utilized. The calculation of any subsequent partial product terms is performed by using only the $A_{in}$ control logic 14 and carry in logic 16 to recode in accordance with the predetermined recoding algorithm. The multiplier operand within the multiplier register 18 provides a predetermined portion of data bits to both the $A_{in}$ 14 control logic and the carry in logic 16, for recoding purposes, for each of the remaining partial product calculations. The multiplication operation is complete, and the result is latched into the storage register (not shown) within the adder circuits 28, when all of the remaining predetermined portions of data bits for recoding within the multiplier operand have been utilized.

By performing the minimal additional recoding of the multiplier operand with the $B_{in}$ 12 control logic during the first partial product calculation, the total number of partial product calculations for the multiply instruction has been reduced. FIG. 4 (A) illustrates the number of data processor cycles required to perform a typical sixteen bit-by-sixteen bit multiply instruction with a conventional multiplier (not shown). FIG. 4(A) illustrates that four data processor cycles are required to calculate the eight partial product terms necessary for the multiply instruction, and that a fifth data processor cycle is utilized to fetch the next instruction. In contrast, FIG. 4(B) illustrates that both the number of data processor cycles and the total number of partial product calculations necessary to perform the same multiply operation have been reduced by one. This allows an instruction fetch for an immediately following instruction to occur during the final machine cycle in which the final partial product for the multiply instruction is being calculated. FIG. 4(B) illustrates that during the first data processor cycle, partial product two and partial product three are calculated. It should be noted that a complete partial product one equivalent to the first partial product in FIG. 4(A) is never calculated within the multiplier of FIG. 3. In contrast, FIG. 4 (B) illustrates that during an equivalent time period, the first data processor cycle, the first and second partial products are being calculated for the same multiply instruction illustrated in FIG. 4 (A).

In summary, the adder 10 of FIG. 2 does not perform a standard four-input adder function, but rather provides a three-input adder function plus an additional arithmetic function by using a weighted fourth input. The weight of the fourth input, in this particular implementation, is a value of two. When the fourth input signal, $C_{in2}$, is a logical one, adder 10 of FIG. 2 performs the logical function of $(A_{in}+B_{in}+2)$. When the $C_{in2}$ input signal is a logical zero, the output of adder 10 is logically identical to a conventional two-input adder with a carry-in. In the implementation of circuit 10 in FIG. 2, the input signal condition of both carry-input $C_{in1}$ and $C_{in2}$ equaling a logic one is not used, and when the carry-input signal $C_{in2}$ is a logical one, the carry-input $C_{in2}$ signal overrides the carry-input $C_{in1}$ signal. By adding a small amount of additinal recoding logic in the form of the Bin 24 control logic of FIG. 3 and by using an adder which can selectively perform the function of $(A_{in}+B_{in}+2)$, the total number of data processor cycles for a multiply instruction is reduced by twenty percent, as illustrated in both FIG. 4(A) and FIG. 4(B).

By now it should be apparent that there has been provided an adder circuit with an encoded carry input, where the encoded carry input has a bit position weight different than those of the other inputs to the adder circuit. It should be well understood that although the above described invention utilizes a weighted carry input of two, alternate values of weight along with combinations of weighted input values may be used. Although the number of bits utilized for the $B_{in}$ 12 control logic recoding is two, as illustrated in Table one, and the number of bits utilized for the $A_{in}$ 14 control logic recoding is three, as illustrated in Table two, any number of recoding bits may be used. It should also be apparent that the adder circuits of the multiplier of FIG.

3 may also be included within an array of adders in an array multiplier.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. An encoded carry input adder circuit, comprising:
   first logic means having a first input for receiving a first input signal, and a second input for receiving a second input signal, the first logic means providing an output by performing a predetermined logic function on the first and second inputs; and
   second logic means coupled to the output of the first logic means and receiving both a third input signal and a fourth input signal, the fourth input signal being selectively weighted to have a different value from the first, second and third input signals, the adder circuit providing an output sum of the first, second and third input signals in response to the fourth input signal having a first logic value and being weighted to have a first predetermined value, and provides a summation of the first and second input signals with the fourth input signal which is weighted to have a second predetermined value when the fourth input signal has a second logic value.

2. The encoded carry input adder circuit of claim 1 wherein the second predetermined value is two.

3. The encoded carry input adder circuit of claim 1 wherein the predetermined logic function is an exclusive OR logic function.

4. The encoded carry input circuit of claim 1 wherein the first predetermined value is zero.

5. In an adder circuit for adding a first operand received at a first data input and a second operand received at a second data input with a carry input number received at a first carry input to provide a sum at a first output terminal and a first carry output at a second output terminal, a method of selectively providing an additional predetermined arithmetic operation using the sum, comprising the steps of:
   providing a second carry input for the adder circuit, the second carry input receiving an encoded carry input number;
   providing the adder circuit with a third output terminal; and
   selectively implementing the additional predetermined arithmetic operation by adding a predetermined weight value to the first and second operands in response to the encoded carry input number having a predetermined logic value, the adder circuit providing a resultant of the additional predetermined arithmetic operation at the first, second and third output terminals.

6. The method of claim 4 wherein the operation of selectively adding a predetermined value to the sum of the first and second operands further comprises adding two to the sum of the first and second operands.

7. The method of claim 4 wherein the step of selectively implementing the additional predetermined arithmetic operation using the sum in response to the encoded carry input number further comprises implementing the additional predetermined arithmetic operation in response to the encoded carry input number being a single bit having a predetermined logic value.

8. An encoded carry input adder circuit, comprising:
   first logic means having a first input for receiving a first input signal having a value of either zero or one, and a second input for receiving a second input signal having a value of either zero or one, the first logic means providing an output by performing a predetermined logic function on the first and second inputs;
   second logic means coupled to the output of the first logic means and receiving a third input signal having a value of either zero or one, the second logic means adding the output of the first logic means and the third input signal to selectively provide an output sum bit and a first output carry bit representing a sum of the first, second and third input signals; and
   third logic means coupled to both the first and second logic means, the third logic means receiving a fourth input signal which is selectively weighted to have a different value from the first, second and third input signals when the fourth input signal assumes a predetermined logic state, the fourth input signal being used to both provide a second output carry bit and to modify the first output carry bit, the output sum bit and first and second output carry bits selectively representing a sum of the first and second input signals and the different valued fourth input signal in response to the fourth input signal.

9. The encoded carry input adder circuit of claim 8 wherein the predetermined logic function is an exclusive OR logic function.

10. The encoded carry input adder circuit of claim 8 wherein the third logic means does not modify the output sum bit in response to receiving the fourth input signal.

11. The encoded carry input adder circuit of claim 8 wherein the first logic means further comprise:
    a half adder circuit having a first input for receiving the first input signal, a second input for receiving the second input signal, and a sum output coupled to the second logic means.

12. The encoded carry input adder circuit of claim 8 wherein the fourth input signal received by the third logic means is weighted by a value of two, and the predetermined arithmetic operation is to add two to the sum of the first and second input signals.

13. The encoded carry input adder circuit of claim 8 wherein the first output carry bit is selectively modified by the second output carry bit.

14. An adder circuit for adding first and second operands and a carry input operand, comprising a first input terminal for receiving the first operand, a second input terminal for receiving the second operand, a carry input terminal for receiving the carry input operand, an encoded input terminal for receiving an encoded input signal, a sum output terminal, and first and second carry output terminals, said adder circuit summing the first, second and carry input operands to provide a first sum output collectively at the sum output terminal and the first and second carry output terminals when the encoded input signal assumes a first logic state, said adder circuit summing the first and second operands and encoded input signal when the encoded input signal assumes a second logic state, said encoded input signal having a predetermined value other than one or zero when the encoded input signal assumes the second logic state.

15. The adder circuit of claim 14 wherein said predetermined value is two.

* * * * *